US007396990B2

(12) United States Patent
Lu et al.

(10) Patent No.: US 7,396,990 B2
(45) Date of Patent: Jul. 8, 2008

(54) AUTOMATIC MUSIC MOOD DETECTION

(75) Inventors: Lie Lu, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 231 days.

(21) Appl. No.: 11/275,100

(22) Filed: Dec. 9, 2005

(65) Prior Publication Data

US 2007/0131096 A1 Jun. 14, 2007

(51) Int. Cl.
*G10H 1/40* (2006.01)
*G10H 7/00* (2006.01)
*G06F 17/00* (2006.01)

(52) U.S. Cl. ........................................... 84/611; 700/94

(58) Field of Classification Search ................... 84/600, 84/611, 622; 700/94

See application file for complete search history.

(56) References Cited

U.S. PATENT DOCUMENTS 5,616,876 A 4/1997 Cluts
6,185,527 B1 2/2001 Petkovic et al.
6,225,546 B1 5/2001 Kraft et al.
6,316,712 B1 11/2001 Laroche
6,545,209 B1 4/2003 Flannery et al.
6,657,117 B2 12/2003 Weare et al.
6,665,644 B1 12/2003 Kanevsky et al.
6,787,689 B1 9/2004 Chen
2002/0148347 A1 10/2002 Herberger
2005/0120868 A1 6/2005 Hinman

OTHER PUBLICATIONS

Liu D. et al., “Form and mood recognition of Johann Strauss’s waltz centos,” Chinese Journal of Electronics, Oct. 2003, vol. 12, No. 4, pp. 587-593.

Pinaquier, et al., “A fusion study in speech/music classification,” 2003 IEEE International Conference on Acoustics, Speech, and Signal Processing, vol. 2, pp. 11-17-20.

(Continued)

*Primary Examiner*—Jeffrey Donels
(74) *Attorney, Agent, or Firm*—Lee & Hayes, PLLC

(57) ABSTRACT

A system and methods use music features extracted from music to detect a music mood within a hierarchical mood detection framework. A two-dimensional mood model divides music into four moods which include contentment, depression, exuberance, and anxious/frantic. A mood detection algorithm uses a hierarchical mood detection framework to determine which of the four moods is associated with a music clip based on the extracted features. In a first tier of the hierarchical detection process, the algorithm determines one of two mood groups to which the music clip belongs. In a second tier of the hierarchical detection process, the algorithm then determines which mood from within the selected mood group is the appropriate, exact mood for the music clip. Benefits of the mood detection system include automatic detection of music mood which can be used as music metadata to manage music through music representation and classification.

18 Claims, 4 Drawing Sheets

OTHER PUBLICATIONS

Liu et al., "A singer identification technique for content-based classification of MP3 music objects," Proceedings of the Eleventh International Conference on Information and Knowledge Management, CIKM 2002, pp. 438-445.

Crysandt, et al., "Music classification with MPEG-7," Proceedings of the SPIE—The International Society for Optical Engineering. 2003, vol. 5021, pp. 397-404.

Shan, et al., "Music style mining and classification by melody," IEICE Transactions of Information and Systems, Mar. 2003, vol. E86-D, No. 3, pp. 655-659.

Lu et al., "FEature analysis for speech/music automatic classification," Journal of Computer Aided Design & Computer Graphics, Mar. 2002, vol. 14, No. 3, pp. 233-237.

Hothker, et al., "Investigating the influence of representations and algorithms in music classification," Computers and the Humanities, Feb. 2001, vol. 35, No. 1, pp. 65-79.

Pye, "Content-based methods for the management of digital music," 2000 IEEE International Conference on Acoustics, Speech, and Signal Processing, vol. 4, pp. 2437-2440.

Tzanetakis, "Musical genre classification of audio signals," IEEE Transactions on Speech and Audio Processing, Jul. 2002, vol. 10, No. 5, pp. 293-302.

AUTOMATIC MUSIC MOOD DETECTION

RELATED APPLICATIONS

This patent application claims priority to parent U.S. patent application Ser. No. 10/811,281 to Lie Lu et al., filed Mar. 25, 2004, and entitled, "Automatic Music Mood Detection."

TECHNICAL FIELD

The present disclosure relates to music classification, and more particularly, to detecting the mood of music from acoustic music data.

BACKGROUND

The recent significant increase in the amount of music data being stored on both personal computers and Internet computers has created a need for ways to represent and classify music. Music classification is an important tool that enables music consumers to manage an increasing amount of music in a variety of ways, such as locating and retrieving music, indexing music, recommending music to others, archiving music, and so on. Various types of metadata are often associated with music as a way to represent music. Although traditional information such as the name of the artist or the title of the work remains important, these metadata tags have limited applicability in many music-related queries. More recently, music management has been aided by the use of more semantic metadata, such as music similarity, style and mood. Thus, the use of metadata as a means of managing music has become increasingly focused on the content of the music itself.

Music similarity is one important metadata that is useful for representing and classifying music. Music genres, such as classical, pop, or jazz, are examples of music similarities that are often used to classify music. However, such genre metadata is rarely provided by the music creator, and music classification based on this type of information generally requires the manual entry of the information or the detection of the information from the waveform of the music.

Music mood information is another important metadata that can be useful in representing and classifying music. Music mood describes the inherent emotional meaning of a piece of music. Like music similarity metadata, music mood metadata is rarely provided by the music creator, and classification of music based on the music mood requires that the mood metadata be manually entered, or that it be detected from the waveform of the music. Music mood detection, however, remains a challenging task which has not yet been addressed with significant effort in the past.

Accordingly, there is a need for improvements in the art of music classification, which includes a need for improving the detectability of certain music metadata from music, such as music mood.

SUMMARY

A system and methods detect the mood of acoustic musical data based on a hierarchical framework. Music features are extracted from music and used to determine a music mood based on a two-dimensional mood model. The two-dimensional mood model suggests that mood comprises a stress factor which ranges from happy to anxious and an energy factor which ranges from calm to energetic. The mood model further divides music into four moods which include contentment, depression, exuberance, and anxious/frantic. A mood detection algorithm determines which of the four moods is associated with a music clip based on features extracted from the music clip and processed through a hierarchical detection framework/process. In a first tier of the hierarchical detection process, the algorithm determines one of two mood groups to which the music clip belongs. In a second tier of the hierarchical detection process, the algorithm determines which mood from within the selected mood group is the appropriate, exact mood for the music clip.

BRIEF DESCRIPTION OF THE DRAWINGS

The same reference numerals are used throughout the drawings to reference like components and features.

DETAILED DESCRIPTION

Overview

The following discussion is directed to a system and methods that use music features extracted from music to detect music mood within a hierarchical mood detection framework. Benefits of the mood detection system include automatic detection of music mood which can be used as music metadata to manage music through music representation and classification. The automatic mood detection reduces the need for manual determination and entry of music mood metadata that may otherwise be needed to represent and/or classify music based on its mood.

Exemplary Environment

Figure 1:
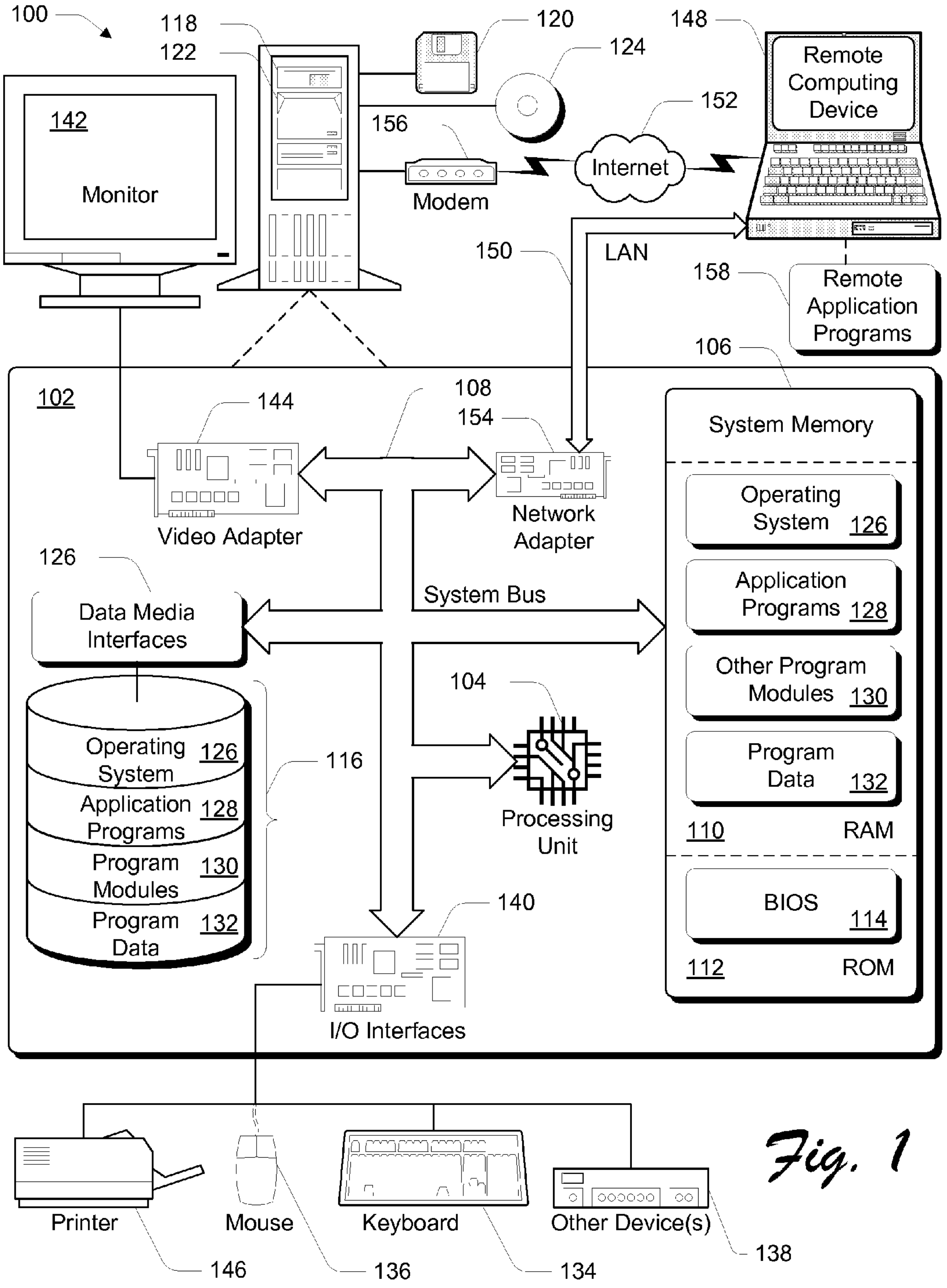
FIG. 1 illustrates an exemplary environment suitable for implementing music mood detection.

FIG. 1 illustrates an exemplary computing environment 100 suitable for detecting music mood. Although one specific computing configuration is shown in FIG. 1, various computers may be implemented in other computing configurations that are suitable for performing music mood detection.

The computing environment 100 includes a general-purpose computing system in the form of a computer 102. The components of computer 102 may include, but are not limited to, one or more processors or processing units 104, a system memory 106, and a system bus 108 that couples various system components including the processor 104 to the system memory 106.

The system bus 108 represents one or more of any of several types of bus structures, including a memory bus or memory controller, a peripheral bus, an accelerated graphics port, and a processor or local bus using any of a variety of bus architectures. An example of a system bus 108 would be a Peripheral Component Interconnects (PCI) bus, also known as a Mezzanine bus.

Computer 102 includes a variety of computer-readable media. Such media can be any available media that is accessible by computer 102 and includes both volatile and non-volatile media, removable and non-removable media. The system memory 106 includes computer readable media in the form of volatile memory, such as random access memory (RAM) 110, and/or non-volatile memory, such as read only memory (ROM) 112. A basic input/output system (BIOS)

114, containing the basic routines that help to transfer information between elements within computer 102, such as during start-up, is stored in ROM 112. RAM 110 contains data and/or program modules that are immediately accessible to and/or presently operated on by the processing unit 104.

Computer 102 may also include other removable/non-removable, volatile/non-volatile computer storage media. By way of example, FIG. 1 illustrates a hard disk drive 116 for reading from and writing to a non-removable, non-volatile magnetic media (not shown), a magnetic disk drive 118 for reading from and writing to a removable, non-volatile magnetic disk 120 (e.g., a "floppy disk"), and an optical disk drive 122 for reading from and/or writing to a removable, non-volatile optical disk 124 such as a CD-ROM, DVD-ROM, or other optical media. The hard disk drive 116, magnetic disk drive 118, and optical disk drive 122 are each connected to the system bus 108 by one or more data media interfaces 126. Alternatively, the hard disk drive 116, magnetic disk drive 118, and optical disk drive 122 may be connected to the system bus 108 by a SCSI interface (not shown).

The disk drives and their associated computer-readable media provide non-volatile storage of computer readable instructions, data structures, program modules, and other data for computer 102. Although the example illustrates a hard disk 116, a removable magnetic disk 120, and a removable optical disk 124, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 116, magnetic disk 120, optical disk 124, ROM 112, and/or RAM 110, including by way of example, an operating system 126, one or more application programs 128, other program modules 130, and program data 132. Each of such operating system 126, one or more application programs 128, other program modules 130, and program data 132 (or some combination thereof) may include an embodiment of a caching scheme for user network access information.

Computer 102 can include a variety of computer/processor readable media identified as communication media. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 102 via input devices such as a keyboard 134 and a pointing device 136 (e.g., a "mouse"). Other input devices 138 (not shown specifically) may include a microphone, joystick, game pad, satellite dish, serial port, scanner, and/or the like. These and other input devices are connected to the processing unit 104 via input/output interfaces 140 that are coupled to the system bus 108, but may be connected by other interface and bus structures, such as a parallel port, game port, or a universal serial bus (USB).

A monitor 142 or other type of display device may also be connected to the system bus 108 via an interface, such as a video adapter 144. In addition to the monitor 142, other output peripheral devices may include components such as speakers (not shown) and a printer 146 which can be connected to computer 102 via the input/output interfaces 140.

Computer 102 may operate in a networked environment using logical connections to one or more remote computers, such as a remote computing device 148. By way of example, the remote computing device 148 can be a personal computer, portable computer, a server, a router, a network computer, a peer device or other common network node, and the like. The remote computing device 148 is illustrated as a portable computer that may include many or all of the elements and features described herein relative to computer system 102.

Logical connections between computer 102 and the remote computer 148 are depicted as a local area network (LAN) 150 and a general wide area network (WAN) 152. Such networking environments are commonplace in offices, enterprise-wide computer networks, intranets, and the Internet. When implemented in a LAN networking environment, the computer 102 is connected to a local network 150 via a network interface or adapter 154. When implemented in a WAN networking environment, the computer 102 includes a modem 156 or other means for establishing communications over the wide network 152. The modem 156, which can be internal or external to computer 102, can be connected to the system bus 108 via the input/output interfaces 140 or other appropriate mechanisms. It is to be appreciated that the illustrated network connections are exemplary and that other means of establishing communication link(s) between the computers 102 and 148 can be employed.

In a networked environment, such as that illustrated with computing environment 100, program modules depicted relative to the computer 102, or portions thereof, may be stored in a remote memory storage device. By way of example, remote application programs 158 reside on a memory device of remote computer 148. For purposes of illustration, application programs and other executable program components, such as the operating system, are illustrated herein as discrete blocks, although it is recognized that such programs and components reside at various times in different storage components of the computer system 102, and are executed by the data processor(s) of the computer.

Exemplary Embodiments

Figure 2:
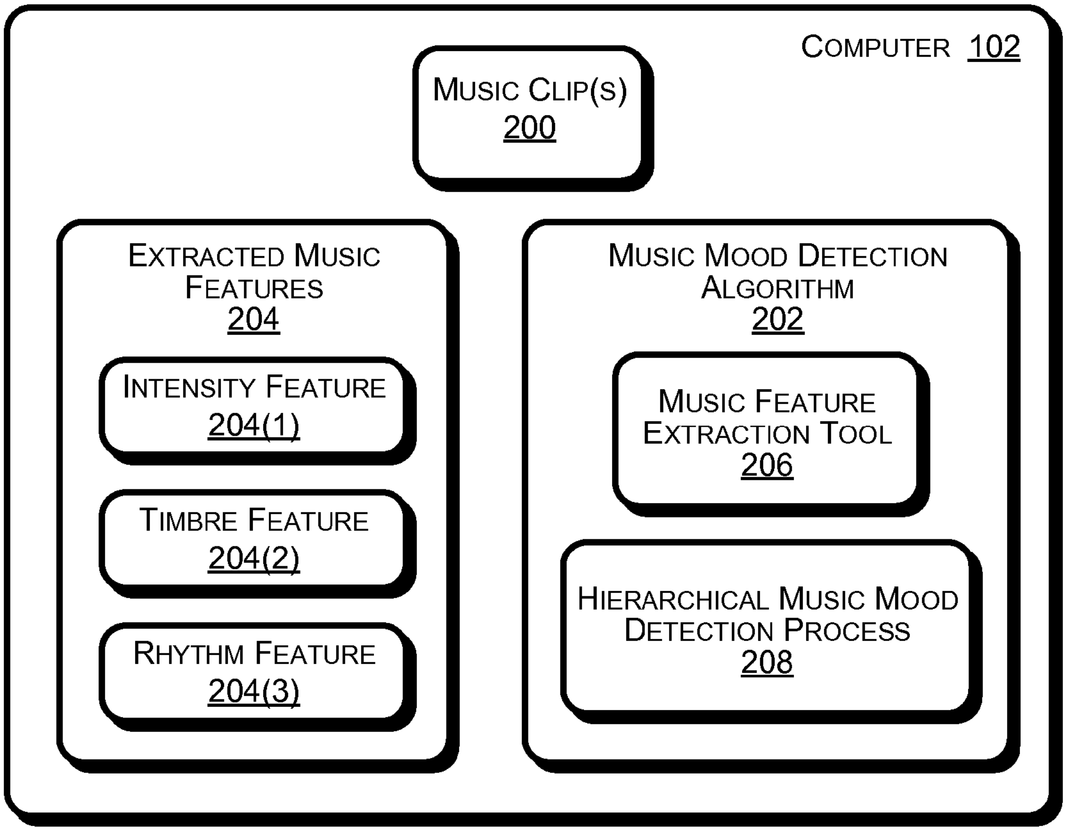
FIG. 2 illustrates a block diagram representation of an exemplary computer showing exemplary components suitable for facilitating music mood detection.

FIG. 2 is a block diagram representation of an exemplary computer 102 illustrating exemplary components suitable for facilitating music mood detection. Computer 102 includes one or more music clips 200 formatted as any of variously formatted music files including, for example, MP3 (MPEG-1 Audio Layer 3) files or WMA (Windows Media Audio) files. Computer 102 also includes a music mood detection algorithm 202 configured to extract music features 204 from a music clip 200, and to classify the music clip according to a hierarchical mood detection framework/process given the extracted music features 204. Accordingly, the music mood detection algorithm 202 generally includes a music feature extraction tool 206 and a hierarchical music mood detection process 208. It is noted that these components (i.e., algorithm 202, extraction tool 206, hierarchical mood detection process 208) are shown in FIG. 2 by way of example only, and not by way of limitation. Their illustration in the manner shown in FIG. 2 is intended to facilitate discussion of music mood detection on a computer 102. Thus, it is to be understood that various configurations are possible regarding the functions performed by these components. For example, such components might be separate stand alone components or they might be combined as a single component on computer 102.

In general, the music mood detection algorithm 202 extracts certain music features 204 from a music clip 200 using music feature extraction tool 206. Mood Detection algorithm 202 then determines a music mood (e.g., Contentment, Depression, Exuberance, Anxious/Frantic, FIGS. 3 and 4) for the music clip 200 by processing the extracted music features 204 through the hierarchical mood detection process 208. The algorithm 202 employs a two-dimensional mood model proposed by Thayer, R. E. (1989), *The biopsychology of mood and arousal*, Oxford University Press (hereinafter, "Thayer"). The two-dimensional model adopts the theory that mood is comprised of two factors: Stress (happy/anxious) and Energy (calm/energetic), and divides music mood into four clusters: Contentment, Depression, Exuberance and Anxious/Frantic as shown in FIG. 3.

Figure 3:
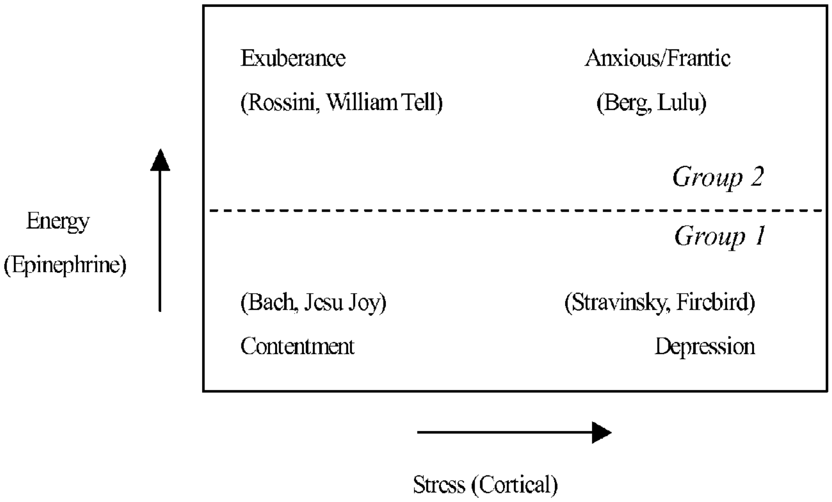
FIG. 3 illustrates an exemplary two-dimensional mood model.

In FIG. 3, Contentment refers to happy and calm music, such as Bach's "Jesus, Joy of Man's Desiring"; Depression refers to calm and anxious music, such as the opening of Stravinsky's "Firebird"; Exuberance refers to happy and energetic music such as Rossini's "William Tell Overture"; and Anxious/Frantic refers to anxious and energetic music, such as Berg's "Lulu". Such definitions of the four mood clusters are explicit and discriminatable. In addition, the two-dimensional structure provides important cues for computational modeling. Therefore, the two-dimensional model is applied in the music mood detection algorithm 202.

As mentioned above, the music feature extraction tool 206 extracts music features from a music clip 200. Music mode, intensity, timbre and rhythm are important features associated with arousing different music moods. For example, major keys are consistently associated with positive emotions, whereas minor ones are associated with negative emotions. However, the music mode feature is very difficult to obtain from acoustic data. Therefore, only the remaining three features, intensity feature 204(1), timbre feature 204(2), and rhythm feature 204(3) are extracted and used in the music mood detection algorithm 202. In Thayer's two-dimensional mood model shown in FIG. 3, the intensity feature 204(1) corresponds to "energy", while both the timbre feature 204(2) and the rhythm feature 204(3) correspond to "stress".

To begin the music mood detection process, a music clip 200 is first down-sampled into a uniform format, such as a 16 KHz, 16 bit, mono-channel sample. It is noted that this is only one example of a uniform format that is suitable, and that various other uniform formats may also be used. The music clip 200 is also divided into non-overlapping temporal frames, such as 32 microsecond-long frames. The 32 microsecond frame length is also only an example, and various other non-overlapping frame lengths may also be suitable. In each frame, an octave-scale filter bank is used to divide the frequency domain into several frequency sub-bands:

$$\left[0, \frac{\omega_0}{2^n}\right), \left[\frac{\omega_0}{2^n}, \frac{\omega_0}{2^{n-1}}\right), \ldots \left[\frac{\omega_0}{2^2}, \frac{\omega_0}{2^1}\right] \quad (1)$$

where $w_0$ refers to the sampling rate and n is the number of sub-band filters. In a preferred implementation, 7 sub-bands are used.

In general, timbre features and intensity features are then extracted from each frame. The means and variances of the timbre features and intensity features of all the frames are calculated across the whole music clip 200. This results in a timbre feature set and an intensity feature set. Rhythm features are also extracted directly from the music clip. In order to remove the relativity among these raw features, a Karhunen-Loeve transform is performed on each feature set. The Karhunen-Loeve transform is well-known to those skilled in the art and will therefore not be further described. After the Karhunen-Loeve transform, each of the resulting three feature vectors is mapped into an orthogonal space, and each resulting covariance matrix also becomes diagonal within the new feature space. This procedure helps to achieve a better classification performance with the Gaussian Mixture Model (GMM) classifier discussed below. Additional details regarding the extraction of the three features (intensity feature 204(1), timbre feature 204(2), and rhythm feature 204(3)) are provided as follows.

As mentioned above, intensity features are extracted from each frame of a music clip 200. In general, intensity is approximated by the root mean-square (RMS) of the signal's amplitude. The intensity of each sub-band in a frame is first determined. An intensity for each frame is then determined by summing the intensities of the sub-bands within each frame. Then all the frame intensities are averaged for the whole music clip 200 to determine the overall intensity feature 204(1) of the music clip. Intensity is important for mood detection because its contrast among the music moods is usually significant, which helps to distinguish between moods. For example, intensity for the music moods of Contentment and Depression is usually small, but for the music moods of Exuberance and Anxious, it is usually big.

Timbre features are also extracted from each frame of a music clip 200. Both spectral shape features and spectral contrast features are used to represent the timbre feature. The spectral shape features and spectral contrast features that represent the timbre feature are listed and defined in Table 1. Spectral shape features, which include centroid, bandwidth, roll off and spectral flux, are widely used to represent the characteristics of music signals. They are also important for mood detection. For example, the centroid for the music mood of Exuberance is usually higher than for the music mood of Depression because Exuberance is generally associated with a high pitch whereas Depression is associated with a low pitch. In addition, octave-based spectral contrast features are also used to represent relative spectral distributions due to their good properties in music genre recognition.

TABLE 1

Definition of Timbre Features

| The Feature Name | | Definition |
|---|---|---|
| Spectral Shape Features | Centroid | Mean of the short-time Fourier amplitude spectrum. |
| | Bandwidth | Amplitude weighted average of the differences between the spectral components and the centroid. |
| | Roll off | 95th percentile of the spectral distribution. |
| | Spectral Flux | 2-Norm distance of the frame-to-frame spectral amplitude difference. |
| Spectral Contrast Features | Sub-band Peak | Average value in a small neighborhood around maximum amplitude values of spectral components in each sub-band. |
| | Sub-band Valley | Average value in a small neighborhood around minimum amplitude values of spectral components in each sub-band. |
| | Sub-band Average | Average amplitude of all the spectral components in each sub-band. |

As mentioned above, rhythm features are also extracted directly from the music clip. Rhythm is a global feature and is determined from the whole music clip 200 rather than from a combination of individual frames. Three aspects of rhythm are closely related with people's mood response. These are, rhythm strength, rhythm regularity, and rhythm tempo. For example, in the Exuberance mood cluster shown in FIG. 3, the rhythm is usually strong and steady with a fast tempo, while in the Depression mood cluster, music usually has a slow tempo and no distinct rhythm pattern. Therefore, these three features (i.e., rhythm strength, regularity, and tempo) are extracted accordingly. Because rhythm features are usually apparent through instruments whose sounds are prominent in the lower and higher sub-bands (e.g., bass instruments and snare drums, respectively), only the lowest sub-band and highest sub-band are used to extract rhythm features.

After an amplitude envelope is extracted from these sub-bands by using a half hamming (raise cosine) window, a Canny estimator is used to estimate a difference curve, which is used to represent the rhythm information. Use of a half hamming window and a Canny estimator are both well-known processes to those skilled in the art, and they will therefore not be further described. The peaks above a given threshold in the difference curve (rhythm curve) are detected as instrumental onsets. Then, three features are extracted as follows:

Average Strength: the average strength of the instrumental onsets.

Average Correlation Peak: the average of the maximum three peaks in the auto-correlation curve. The more regular the rhythm is, the higher the value is.

Average Tempo: the maximum common divisor of the peaks of the auto-correlation curve.

Figure 4:
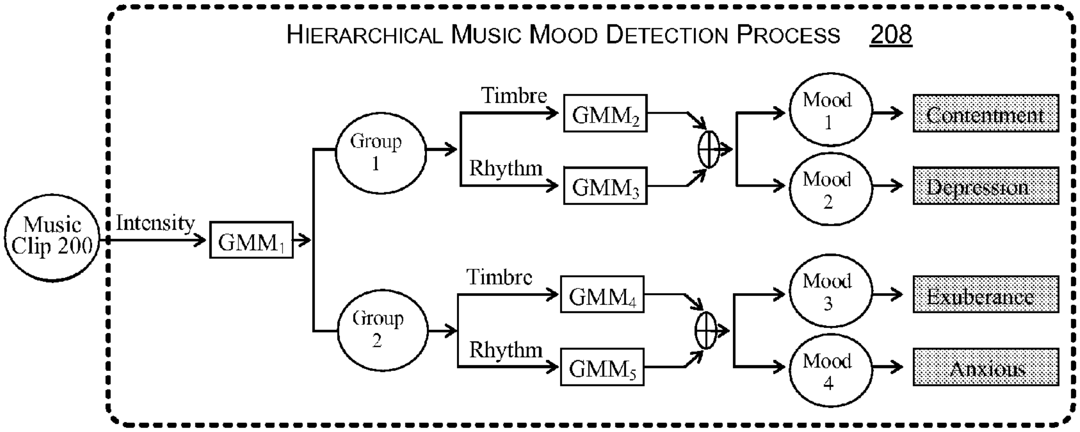
FIG. 4 illustrates an exemplary hierarchical mood detection framework/process.

As illustrated in FIG. 4, the music mood detection algorithm 202 performs mood detection through a hierarchical mood detection framework/process 208 based on the three extracted feature sets (i.e., intensity feature 204(1), timbre feature 204(2), and rhythm feature 204(3)) and Thayer's two-dimensional mood model. The different extracted features (e.g., intensity feature 204(1), timbre feature 204(2), and rhythm feature 204(3)) perform differently in discriminating between different music moods (e.g., Contentment, Depression, Exuberance, Anxious). Accordingly, as shown below, the hierarchical mood detection process 208 has the advantage of making it possible to use the most suitable features in different tasks. Moreover, like other hierarchical methods, it can make better use of sparse training data than its non-hierarchical counterparts.

In the hierarchical mood detection process 208 illustrated in FIG. 4, a Gaussian Mixture Model (GMM) is utilized to model each feature set. In constructing each GMM, the Expectation Maximization (EM) algorithm is used to estimate the parameters of the Gaussian component and mixture weights. The initialization is performed using the K-means algorithm. The EM and K-means algorithms are well-known to those skilled in the art and they will therefore not be further described.

The basic flow of the hierarchical mood detection process 208 is illustrated in FIG. 4, and can be generally described as follows. It is noted first, however, that the ensuing discussion presumes that the music features 204 have already been extracted from the music clip 200 by the music feature extraction tool 206 of the music mood detection algorithm 202.

As shown in FIG. 4, for a given music clip 200, the music clip 200 is first classified into Group 1 (Contentment and Depression) or Group 2 (Exuberance and Anxious) based on its intensity feature 204(1) information. This is done because the energy of the Contentment and Depression moods is usually much less than the energy of the Exuberance and Anxious moods. Thus, discrimination between these 2 mood groups is very accurate on the basis of the intensity feature 204(1) alone. To classify the music clip into different groups, simple Bayesian criteria are employed, as $$\frac{P(G_1|I)}{P(G_2|I)}\begin{cases}\geq 1, \text{ Select } G_1\\ <1, \text{ Select } G_2\end{cases} \tag{2}$$

where $G_i$ represents different mood group, I represents the intensity feature set. Given the intensity feature, I, the probabilities of Group 1 and Group 2 are determined. Group 1 is selected if the probability of Group 1 is greater than or equal to the probability of Group 2. Otherwise, Group 2 is selected.

Then classification is performed in each group (i.e., for whichever group is selected according to equation (2) above) based on timbre and rhythm features. In each group, the probability of being an exact mood given timber feature 204 (2) and rhythm feature 204(3) can be calculated as $$P(M_j|G_1,T,R)=\lambda_1\times P(M_j|T)+(1-\lambda_1)\times P(M_j|R)j=1,2$$

$$P(M_j|G_2,T,R)=\lambda_2\times P(M_j|T)+(1-\lambda_2)\times P(M_j|R)j=3,4 \tag{3}$$

where $M_j$ is the mood cluster, T and R represent timbre and rhythm features respectively, and $\lambda_1$ and $\lambda_2$ are two weighting factors to emphasize different features for the mood detection in different mood groups. After each probability is obtained, Bayesian criteria, similar to Equation 2, are again employed to classify the music clip 200 into an exact music mood cluster.

In Group 1, the tempo of both mood clusters (i.e., Contentment and Depression moods) is usually slow and the rhythm pattern is generally not steady, while the timbre of Contentment is usually much brighter and more harmonic than that of Depression. Therefore, the timbre features are more important than the rhythm features in the classification in Group 1. On the contrary, in Group 2 (i.e., Exuberance and Anxious moods), rhythm features are more important. Exuberance usually has a more distinguished and steady rhythm than Anxious, while their timbre features are similar, since the instruments of both mood clusters are mainly brass. On this basis, weighting factor $\lambda_1$ is usually set larger than 0.5, while weighting factor $\lambda_2$ is set at less than 0.5. Experiments indicate that the optimal average accuracy is archived when $\lambda_1$=0.8, $\lambda_2$=0.4. This confirms that the hierarchical mood detection process 208 provides the advantage of stressing different music features in different classification tasks to achieve improved results.

Exemplary Methods

Figure 5:
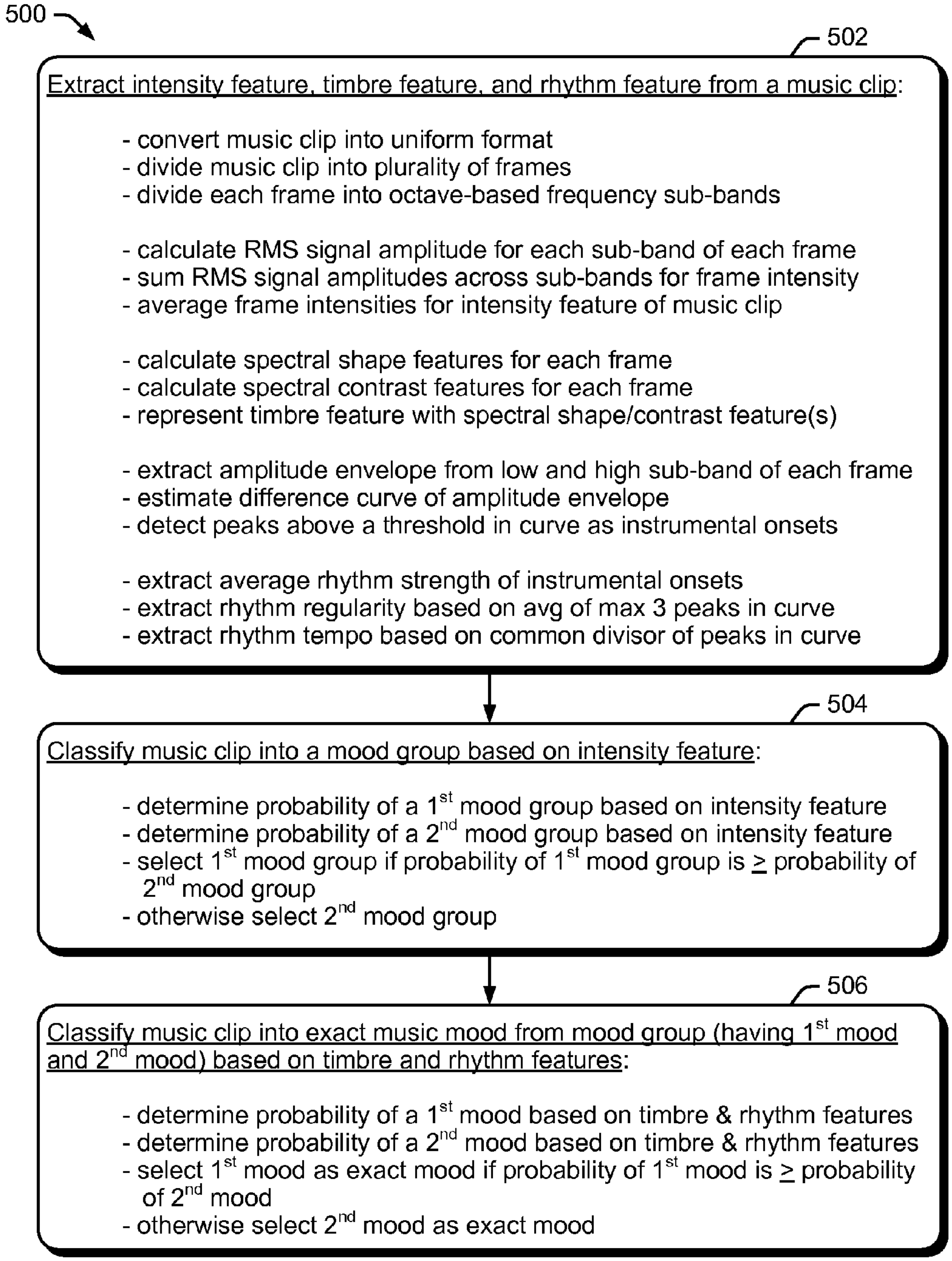
FIG. 5 is a flow diagram illustrating exemplary methods for implementing music mood detection.

Example methods for detecting the mood of acoustic musical data based on a hierarchical framework will now be described with primary reference to the flow diagram of FIG. 5. The methods apply to the exemplary embodiments discussed above with respect to FIGS. 1-4. While one or more methods are disclosed by means of flow diagrams and text associated with the blocks of the flow diagrams, it is to be understood that the elements of the described methods do not necessarily have to be performed in the order in which they are presented, and that alternative orders may result in similar advantages. Furthermore, the methods are not exclusive and can be performed alone or in combination with one another. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

At block 502 of method 500, three music features 204 are extracted from a music clip 200. The extraction may be performed, for example, by a music feature extraction tool 206 of music mood detection algorithm 202. The extracted features are an intensity feature 204(1), a timbre feature 204(2), and a rhythm feature 204(3). The feature extraction includes converting (down-sampling) the music clip into a uniform format, such as a 16 KHz, 16 bit, mono-channel sample. The music clip 200 is also divided into non-overlapping temporal frames, such as 32 microsecond-long frames. The frequency domain of each frame is divided into several frequency sub-bands (e.g., 7 sub-bands) according to equation (1) shown above.

Extraction of the intensity feature includes calculating the RMS signal amplitude for each sub-band from each frame. The RMS signal amplitudes are summed across the sub-bands of each frame to determine a frame intensity for each frame. The intensity feature of the music clip 200 is then found by averaging the frame intensities.

Extraction of the timbre feature includes determining spectral shape features and spectral contrast features of each sub-band of each frame and then determining these features for each frame. The spectral shape features and spectral contrast features that represent the timbre feature are listed and defined above in Table 1. Calculations of the spectral shape and spectral contrast features are based on the definitions provided in Table 1. Such calculations are well-known to those skilled in the art and will therefore not be further described. Spectral shape features include a frequency centroid, bandwidth, roll off and spectral flux. Spectral contrast features include the sub-band peak, the sub-band valley, and the sub-band average of the spectral components of each sub-band.

Extraction of the rhythm feature is based on the whole music clip 200 rather than a combination of individual sub-bands and frames. Only the lowest sub-band and highest sub-band of the frames are used to extract rhythm features. An amplitude envelope is extracted from these sub-bands using a half hamming (raise cosine) window. A Canny estimator is then used to estimate a difference curve, which is used to represent the rhythm information. The half hamming window and Canny estimator are both well-known processes to those skilled in the art, and they will therefore not be further described. The peaks above a given threshold in the difference curve (rhythm curve) are detected as instrumental onsets. Then, an average rhythm strength feature is determined as the average strength of the instrument onsets, an average correlation peak (representing rhythm regularity) is determined as the average of the maximum three peaks in the auto-correlation curve (obtained from difference curve), and the average rhythm tempo is determined based on the maximum common divisor of the peaks of the auto-correlation curve (obtained from difference curve).

At block 504 of method 500, the music clip 200 is classified into a mood group based on the extracted intensity feature 204(1). The classification is an initial classification performed as a first stage of a hierarchical music mood detection process 208. The initial classification is done in accordance with equation (2) shown above. The mood group into which the music clip 200 is initially classified, is one of two mood groups. Of the two mood groups, one is a contentment-depression mood group, and the other is an exuberance-anxious mood group. The initial classification into the mood group includes determining the probability of a first mood group based on the intensity feature. The probability of a second mood group is also determined based on the intensity feature. If the probability of the first mood group is greater than or equal to the probability of the second mood group, then the first mood group is selected as the mood group into which the music clip 200 is classified. Otherwise, the second mood group is selected. Thus, the initial classification classifies the music clip 200 into either the contentment-depression mood group or the exuberance-anxious mood group.

At block 506 of method 500, the music clip is classified into an exact music mood from within the selected mood group from the initial classification. Therefore, if the music clip has been classified into the contentment-depression mood group, it will now be further classified into an exact mood of either contentment or depression. If the music clip has been classified into the exuberance-anxious mood group, it will now be further classified into an exact mood of either exuberance or anxious. Classifying the music clip into an exact mood is done in accordance with equation (3) above. Classifying the music clip therefore includes determining the probability of a first mood based on the timbre and rhythm features in accordance with equation (3) shown above. The probability of a second mood is also determined based on the timbre and rhythm features. The first mood and the second mood are each a particular mood within the mood group into which the music clip was initially classified (e.g., contentment or depression from the contentment-depression mood group, or exuberance or anxious from the exuberance-anxious mood group). If the probability of the first mood is greater than or equal to the probability of the second mood, then the first mood is selected as the exact mood into which the music clip 200 is classified. Otherwise, the second mood is selected as the exact mood.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A computer-readable storage medium including instructions, which when executed by a computer implement a mood detection module to classify a music clip as a music mood according to music features extracted from the music clip, comprising:

an extraction tool to extract the music features; and a hierarchical music mood detection module to determine a mood group based on a first music feature and to determine an exact music mood from within the mood group based on a second and third music feature; and wherein the mood detection module classifies the music clip according to the determined mood for storage and retrieval of the music clip.

2. The computer-readable storage medium as recited in claim 1, wherein the extraction tool extracts an intensity feature, a timbre feature, and a rhythm feature from the music clip;

the hierarchical music mood detection module classifies the music clip into a mood group based on the intensity feature; and the hierarchical music mood detection module classifies the music clip into an exact music mood from the mood group based on the timbre feature and the rhythm feature.

3. The computer-readable storage medium as recited in claim 1, wherein the extraction tool:

converts the music clip into a uniform music clip having a uniform format;

divides the uniform music clip into a plurality of frames; and divides each frame into a plurality of octave-based frequency sub-bands.

4. The computer-readable storage medium as recited in claim 3, wherein the extraction tool:

calculates a root mean-square (RMS) signal amplitude for each sub-band of each frame;

sums the RMS signal amplitudes across the sub-bands of each frame to determine a frame intensity for each frame; and averages the frame intensities to determine the intensity feature for the music clip.

5. The computer-readable storage medium as recited in claim 3, wherein the extraction tool extracts a timbre feature by:

calculating spectral shape features for each frame;

calculating spectral contrast features for each frame; and representing the timbre feature with one or more of the spectral shape features or one or more of the spectral contrast features.

6. The computer-readable storage medium as recited in claim 3, wherein the extraction tool extracts a rhythm feature by:

extracting an amplitude envelope from the lowest sub-band and the highest sub-band of each frame across the uniform music clip;

estimating a difference curve of the amplitude envelope; and detecting peaks above a threshold within the difference curve, the peaks being instrumental onsets.

7. The computer-readable storage medium as recited in claim 6, wherein the extraction toot extracts a rhythm feature by:

extracting an average rhythm strength of the instrumental onsets;

extracting a rhythm regularity value based on the average of the maximum three peaks in the difference curve; and extracting a rhythm tempo based on a common divisor of peaks in the difference curve.

8. The computer-readable storage medium as recited in claim 1, wherein the hierarchical music mood detection module classifies the music clip into a mood group by:

determining the probability of a first mood group based on the intensity feature;

determining the probability of a second mood group based on the intensity feature;

selecting the first mood group if the probability of the first mood group is greater than or equal to the probability of the second mood group; and otherwise selecting the second mood group.

9. The computer-readable storage medium as recited in claim 1, wherein the hierarchical music mood detection module classifies the music clip into a mood group selected from the group of mood groups consisting of:

a contentment and depression mood group; and an exuberance and anxious mood group.

10. The computer-readable storage medium as recited in claim 1, wherein the mood group includes a first mood and a second mood, and the hierarchical music mood detection module classifies the music clip into an exact music mood by:

determining the probability of the first mood based on the timbre feature and the rhythm feature;

determining the probability of the second mood based on the timbre feature and the rhythm feature;

selecting the first mood as the exact mood if the probability of the first mood is greater than or equal to the probability of the second mood; and otherwise selecting the second mood as the exact mood.

11. The computer-readable storage medium as recited in claim 10, wherein the mood group is selected from the group of mood groups consisting of:

a first mood group that includes a contentment mood and a depression mood; and a second mood group that includes an exuberance mood and an anxious mood.

12. A mood detection system to determine a mood of a music clip, comprising:

a computing device;

a music feature extraction tool running on the computing device to extract music features from the music clip;

a hierarchical mood detector to determine a mood group of the music clip based on a first music feature extracted by the music feature extraction tool and to determine an exact music mood from within the mood group based on a second and third music feature extracted by the music feature extraction tool; and wherein the mood detection system indexes the music clip according to the determined mood for storage and retrieval of the music clip.

13. The mood detection system as recited in claim 12, wherein the music features comprise an intensity feature, a timbre feature, and a rhythm feature.

14. The mood detection system as recited in claim 13, further comprising:

a first classifier that classifies the music clip into a mood group based on the intensity feature; and a second classifier that classifies the music clip into an exact music mood from the mood group based on the timbre feature and the rhythm feature.

15. The mood detection system as recited in claim 14, wherein the first classifier classifies the music clip into a mood group by:

determining the probability of a first mood group based on the intensity feature;

determining the probability of a second mood group based on the intensity feature;

selecting the first mood group if the probability of the first mood group is greater than or equal to the probability of the second mood group; and otherwise selecting the second mood group.

16. The mood detection system as recited in claim 15, wherein the first classifier classifies the music clip into a mood group selected from the group of mood groups consisting of:

a contentment and depression mood group; and an exuberance and anxious mood group.

17. The mood detection system as recited in claim 14, wherein the second classifier classifies the music clip into an exact music mood by:

determining the probability of the first mood based on the timbre feature and the rhythm feature;

determining the probability of the second mood based on the timbre feature and the rhythm feature selecting the first mood as the exact mood if the probability of the first mood is greater than or equal to the probability of the second mood; and otherwise selecting the second mood as the exact mood.

18. A system, comprising:

means for extracting an intensity feature, a timbre feature, and a rhythm feature from a music clip;

means for classifying the music clip into a mood group based on the intensity feature;

means for classifying the music clip into an exact music mood from the mood group based on the timbre feature and the rhythm feature; and means for indexing the music clip according to the determined mood for storage and retrieval of the music clip.

* * * * *

UNITED STATES PATENT AND TRADEMARK OFFICE

CERTIFICATE OF CORRECTION

PATENT NO. : 7,396,990 B2
APPLICATION NO. : 11/275100
DATED : July 8, 2008
INVENTOR(S) : Lie Lu et al.

It is certified that error appears in the above-identified patent and that said Letters Patent is hereby corrected as shown below:

In column 11, line 54, in Claim 7, delete "toot" and insert -- tool --, therefor.

Signed and Sealed this
Nineteenth Day of April, 2011

David J. Kappos
*Director of the United States Patent and Trademark Office*